US012164962B2

(12) United States Patent
Ramesh (10) Patent No.: US 12,164,962 B2
(45) Date of Patent: Dec. 10, 2024

(54) NAVIGATIONAL ASSISTANCE FOR THE VISUALLY IMPAIRED

(71) Applicant: Micron Technology, Inc., Boise, ID (US)

(72) Inventor: Vijay S. Ramesh, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 632 days.

(21) Appl. No.: 17/409,498

(22) Filed: Aug. 23, 2021

(65) Prior Publication Data

US 2023/0056834 A1  Feb. 23, 2023

(51) Int. Cl.
*G06F 9/46* (2006.01)
*G06F 9/50* (2006.01)
*G06V 10/94* (2022.01)
*G06V 10/98* (2022.01)
*G06V 20/20* (2022.01)
*G09B 21/00* (2006.01)

(52) U.S. Cl.
CPC .......... *G06F 9/5016* (2013.01); *G06V 10/955* (2022.01); *G06V 10/98* (2022.01); *G06V 20/20* (2022.01); *G09B 21/003* (2013.01); *G09B 21/006* (2013.01); *G09B 21/007* (2013.01); *G06F 2209/501* (2013.01); *G06F 2209/5017* (2013.01)

(58) Field of Classification Search
CPC ...... G06F 9/5016; G06V 20/20; G06V 10/98; G06V 10/955; G09B 21/003; G09B 21/006; G09B 21/007
See application file for complete search history.

(56) References Cited

U.S. PATENT DOCUMENTS

| 6,502,032 | B1 | 12/2002 | Newman |
| 9,734,817 | B1* | 8/2017 | Putrycz .................. G10L 13/04 |
| 2003/0179133 | A1 | 9/2003 | Pepin et al. |
| 2006/0129308 | A1 | 6/2006 | Kates et al. |
| 2016/0019137 | A1* | 1/2016 | Ellis ........................ G11C 16/10 |
| | | | 711/103 |
| 2023/0013998 | A1* | 1/2023 | Mody .................... G06F 9/5016 |

FOREIGN PATENT DOCUMENTS

CN    103750985 A    4/2014

* cited by examiner

*Primary Examiner* — Tammy E Lee
(74) *Attorney, Agent, or Firm* — Brooks, Cameron & Huebsch, PLLC (57) ABSTRACT

A method for navigational assistance for the visually impaired can include determining that an image captured by an imaging device contains an unknown object and determining that the unknown object is not resolvable within a threshold period of time. The method can further include performing an operation to reallocate computing resources between memory devices couplable to the imagining device in response to determining that the unknown object is not resolvable within the threshold period of time. Data corresponding to the unknown object can be written to the reallocated computing resources and an operation involving the data corresponding to the unknown object can be performed to resolve the unknown object using the reallocated computing resources.

24 Claims, 5 Drawing Sheets

NAVIGATIONAL ASSISTANCE FOR THE VISUALLY IMPAIRED

TECHNICAL FIELD

The present disclosure relates generally to semiconductor memory and methods, and more particularly, to apparatuses, systems, and methods for navigational assistance for the visually impaired.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Methods, apparatuses, and systems relating to navigational assistance for the visually impaired are described herein. As described below, a method for navigational assistance for the visually impaired can include determining that an image captured by an imaging device contains an unknown object. Such methods can include determining that the unknown object is not resolvable within a threshold period of time. Operations to reallocate computing resources between memory devices couplable to the imagining device can be performed in response to determining that the unknown object is not resolvable within the threshold period of time can be performed. Data corresponding to the unknown object can be written to the reallocated computing resources and an operation involving the data corresponding to the unknown object can be performed to resolve the unknown object using the reallocated computing resources.

One of the many challenges faced by visually impaired (e.g., blind, deafblind, or partially blind) people is navigation in a world that is largely designed for sighted people. For example, it can be difficult for visually impaired people to navigate their way through cities, towns, shopping malls, stores, etc. to perform daily activities and tasks without the benefit of sight to rely upon. In order to alleviate some of the challenges associated with providing accurate and reliable navigation for visually impaired people, various technologies have been developed that generally rely on the global positioning system (GPS) to provide navigation to visually impaired people.

Some such GPS-based approaches are implemented in standalone devices while others are provided in the form of applications executed by a mobile computing device, such as a smartphone. As used herein, the term "mobile computing device" generally refers to a handheld computing device (e.g., a smartphone) that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

Although the aforementioned GPS-based approaches can mitigate some of the challenges faced by visually impaired people with respect to navigation, they can exhibit various shortcomings. For example, GPS-based navigation devices and/or applications can fail to provide accurate routing in enclosed spaces, such as shopping malls, subways, enclosed parking lots, etc. where there may not be a direct line of sight between GPS information and a navigation device used by a visually impaired person. By failing to provide accurate navigation in said enclosed spaces, some approaches can provide inaccurate routes that can mislead or confuse a visually impaired person, thereby exacerbating the challenges that visually impaired people already face on a daily basis.

Further, some approaches to navigation assistance, especially for visually impaired people, may not be able to respond to the introduction of an unknown (e.g., unidentifiable) object that enters a route that a visually impaired person is traversing. For example, if an unknown object is introduced into a route that is being traversed by a visually impaired person at the direction of devices and/or applications prevalent in some approaches, the devices and/or applications of such approaches may fail to resolve such unknown objects in an accurate and/or timely manner. For example, some approaches may fail to adequately allocate computing resources within a computing device (e.g., a mobile computing device) in scenarios in which an unknown object is captured or otherwise detected by an imagining device associated with the computing device and may therefore not be able to resolve such unknown objects in an accurate and/or timely manner. As used herein, the terms "resolve" and "resolution," as appropriate given the context, generally refer to identify and/or determine what the unknown object is.

In scenarios in which the presence of an unknown object generates an impending danger or threat to a visually impaired person, risk of bodily injury or harm to the visually impaired person may occur. For instance, if a visually impaired person is navigating outdoors using a navigation assistance device that operates in accordance with the approaches described above and an unknown object is on a trajectory to contact the visually impaired person, the limitations of the above approaches may lead to a situation in which the visually impaired person is struck by the unknown object and possibly injured. As an example, if the visually impaired person is navigating through a park where people are engaging in various leisure activities, a situation could arise in which a baseball, softball, soccer ball, frisbee, etc. (e.g., an unknown object) is errantly struck and embarks on a trajectory that could result in a collision with the visually impaired person. In this example, the above approaches may fail to detect and/or resolve the unknown object and/or provide instruction to the visually impaired person to alter their route prior to the unknown object striking the visually impaired person.

It is noted that the above example is illustrative in nature and shall not be construed as limiting to the disclosure herein. For example, other types of unknown objects than those enumerated in the above example are contemplated. Several additional non-limiting examples of objects that can behave as unknown objects and that can present a danger to a visually impaired person include objects that may be placed in different locations on different days or times of the day, such as sandwich boards, traffic cones, temporary road construction signs, etc. In addition to, or in the alternative, objects such as bicycles, scooters, trash cans, garbage bags, litter, construction detritus, etc. may be present along a route of the visually impaired person at certain times and not present at other times, leading to potentially dangerous scenarios if not detected and resolved by the navigation device. Yet another non-limiting example of an object that may behave as an unknown object and may enter the route of a visually impaired person may be an animal (domesticated or otherwise) that could present a danger to the visually impaired person if not accurately and/or quickly resolved.

In order to address these and other issues associated with some currently implemented approaches, aspects of the present disclosure can allow for accurate and/or timely resolution of unknown objects, particularly with respect to navigation assistance for visually impaired people. For example, embodiments described herein can allow for timely and accurate resolution of unknown objects by purposeful reallocation of computing resources (e.g., processing resources and/or memory resources) available to a mobile computing device such that the most efficient (e.g., the fastest, most accurate, etc.) computing resources are available as needed to process information regarding the unknown object to resolve the unknown object and allow a visually impaired user of the mobile computing device to safely navigate in the presence of the unknown object, particularly if the unknown object is determined to present an impending danger to the visually impaired person.

As described in more detail herein, in some embodiments, the mobile computing device can perform operations to resolve the unknown object in the absence of transferring information corresponding to the unknown object to a location external to the mobile computing device. For example, in some embodiments, the mobile computing device can perform operations to reallocate computing resources available to the mobile computing device to enable the most efficient computing resources to be available as needed to process information regarding the unknown object to resolve the unknown object in the absence of transferring information corresponding to the unknown object to a location external to the mobile computing device, such as a base station or other processing circuitry external to the mobile computing device.

However, some embodiments described herein allow for the mobile computing device to communicate with one or more base stations and/or Wi-Fi hotspots in addition to, or in the absence of communication with a GPS network. This can allow the mobile computing device to receive more localized and up-to-date routing information in comparison to approaches that rely solely on GPS-based navigation. Further, in some embodiments, the mobile computing device can transfer information to and from the base station(s) and/or Wi-Fi hotspots as part of an operation to resolve an unknown object. That is, in some embodiments, the mobile computing device can transfer information corresponding to the unknown object (e.g., an image of the unknown object captured by an imaging device associated with the mobile computing device) to the base station and the base station can assist in identification of the unknown object.

Further, aspects of the present disclosure seek to improve the performance of a computing system (e.g., a mobile computing device) in processing applications (e.g., applications directed to navigational assistance for visually impaired people) that can give rise to demanding workloads to be processed by a mobile computing device. As used herein, the term "application" generally refers to one or more computer programs that can include computing instructions that are executable to cause a computing system to perform certain tasks, functions, and/or activities. An amount of computing resources (e.g., processing resources and/or memory resources) consumed in execution of an application can be measured in terms of a "workload." As used herein, the term "workload" generally refers to the aggregate computing resources consumed in execution of applications that perform a certain task, function, and/or activity. During the course of executing an application, multiple sub-applications, sub-routines, etc. may be executed by the computing system 100. The amount of computing resources consumed in executing the application (including the sub-applications, sub-routines, etc.) can be referred to as the workload.

Some applications that can give rise to demanding workloads include applications that process data, such as images and/or video, in real time. Such applications, especially when processing of high-quality images and/or video in real time to correct imperfections in images and/or video are requested, can request usage of a large quantity of computing resources, and therefore create a demanding workload. Some examples of these kinds of applications can include applications designed to provide navigation assistance to visually impaired people that can rely on images and/or video captured in real time to make decisions that can affect the safety of a visually impaired user of the application.

As workloads become increasingly demanding, especially in light of improvements to broadband cellular network technology, issues associated with optimization of workload handling can become further exacerbated in mobile computing devices (e.g., smartphones, tablets, phablets, and/or Internet-of-Things (IoT) devices, among others) where physical space constraints can dictate the amount of processing resources and/or memory resources available to the device. In addition, execution of demanding workloads using mobile computing devices can, in some approaches, quickly drain battery resources available to the mobile computing device and/or cause unwanted thermal behavior (e.g., the mobile computing device can become too hot to operate in a stable manner, etc.) for the mobile computing device.

In order to attempt to execute demanding workloads on mobile computing devices, some approaches can include throttling performance of the mobile computing device during execution of some kinds of workloads to ensure sufficient computing resources are available to execute demanding workloads. In addition, some approaches can include throttling performance of the mobile computing device during execution of some kinds of workloads in an attempt to mitigate adverse effects on battery consumption and/or thermal behavior. However, such approaches may therefore only use a subset of the available computing resources and/or may not be able to take advantage of the available computing resources. This can be especially problematic in mobile computing devices which, as mentioned above may already feature diminished computing resources due to space constraints in comparison with, for example, a desktop computing device.

In contrast, embodiments described herein can provide hardware circuitry (e.g., a controller, processor, etc.) that can monitor and/or determine characteristics of workloads executed in a computing system or mobile computing device when data corresponding to the workloads is stored in different types of memory devices. The hardware circuitry can, based on the monitored or determined characteristics of the workloads, write at least a portion of the workload to a different type of memory device. For example, if the workload is executed while the data corresponding to the workload is stored in a volatile memory device and the hardware circuitry determines that execution of the workload can be optimized if the data corresponding to the workload is stored in a non-volatile memory device, the hardware circuitry can cause at least a portion of the data corresponding to the workload to be written to the non-volatile memory device. Such dynamic determination of workload characteristics and subsequent allocation of workloads to memory devices that include different types of media can be especially beneficial in mobile computing systems, especially as increasingly processing resource intensive workloads are executed on mobile computing devices.

Non-limiting examples of how the workload can be optimized can include optimizing battery consumption of the computing system, bandwidth associated with the computing system, computing resource consumption associated with the computing system, and/or speed of execution of the workload by the computing system, among others. For example, if the computing system is a mobile computing device (e.g. a smartphone, IoT device, etc.), battery power of the computing device may be rapidly depleted when the workload is executed involving certain types of high power consumption memory devices. Accordingly, in order to optimize battery power consumption, for example of a mobile computing device, the hardware circuitry can cause at least a portion of the data corresponding to the workload to be written to a memory device that is characterized by a lower power consumption in executing the workload.

Another non-limiting example of the workload can be optimized can include optimizing execution of the workload by utilizing memory devices and/or media types that exhibit different memory capacities versus bandwidth capabilities. For example, a memory device that exhibits high capacity but low bandwidth (e.g., a NAND memory device) can be utilized for execution of some types of workloads (or portions thereof) while a memory device that exhibits high bandwidth but low capacity (e.g., a 3D stacked SDRAM memory device) can be utilized for execution of some types of workloads (or portions thereof). By leveraging the capacity of a memory device that exhibits high capacity but low bandwidth, or vice versa, for differing workloads, embodiments herein can optimize an amount of time, processing resources, and/or power consumed in executing resource intensive applications in a computing device or mobile computing device. Embodiments are not so limited, however, and other examples of optimizing execution of the workload in accordance with the disclosure are described in more detail, herein.

As described in more detail, herein, embodiments can further optimize execution of workloads in mobile computing system by writing data associated with the workloads to the memory devices based on characteristics of that data such as access frequencies of data involved in execution of the workloads. Access frequency of the data can refer to a quantity of accesses (e.g., reads, writes, etc.) involving the data in execution of the workloads. Access frequency of the data can be referred to herein in terms of "hot data" and "cold data." "Cold data," as used herein, means that a particular memory object has not been accessed for a long duration relative to other memory objects read from a memory device. "Hot data," as used herein, means that a particular memory object has been accessed frequently relative to other memory objects read from a memory device.

For example, if certain data involved in execution of a workload is determined to be "hot," such data can be written to a memory device that includes a media type that is well suited for making data quickly accessible. A non-limiting example of a memory device to which hot data can be written during execution of the workloads described herein is a volatile memory device such as a DRAM device.

In contrast, if certain data involved in execution of a workload is determined to be "cold," such data can be written to a memory device that includes a media type that is well suited for storing data that is not frequently accessed. A non-limiting example of a memory device to which cold data can be written during execution of the workloads described herein is a non-volatile memory device such as a NAND flash device.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements, e.g., elements 543-1 to 543-N (or, in the alternative, 543-1, . . . , 543-N) may be referred to generally as 543. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
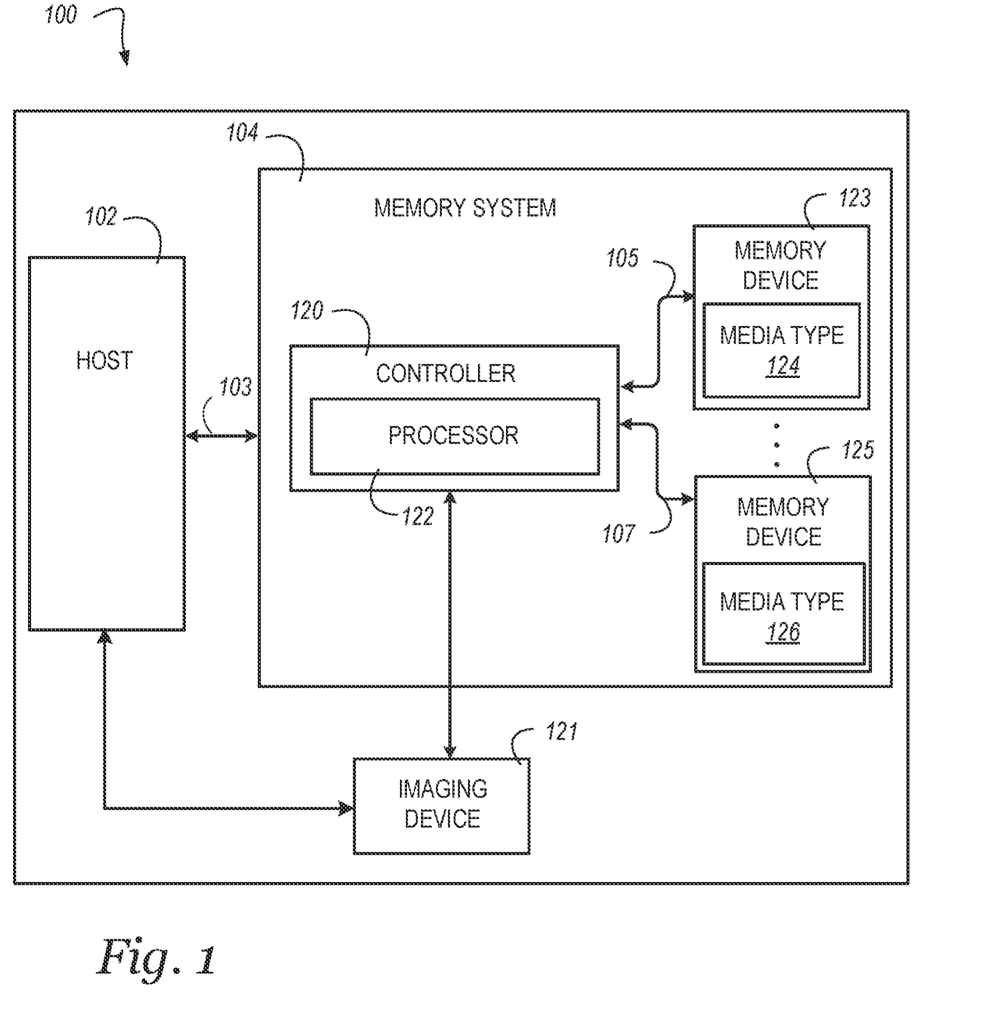
FIG. 1 is a functional block diagram in the form of an apparatus including a host and a memory device in accordance with a number of embodiments of the present disclosure.

FIG. 1 is a functional block diagram in the form of a computing system 100 including an apparatus including a host 102 and a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In some embodiments, the computing system 100 can be a mobile computing system (e.g., a mobile computing device, such as the mobile computing device 501 illustrated in FIG. 5, which can be a smartphone, a tablet, a phablet, and/or a IoT device, among others). The memory system 104 can include a number of different memory devices 123, 125 (and/or 227 illustrated in FIG. 2, herein), which can include one or more different media types 123, 125 (and/or 227 illustrated in FIG. 2, herein). The different memory devices 123, 125, and/or 227 can include one or more memory modules (e.g., single in-line memory modules, dual in-line memory modules, etc.).

The memory system 104 can include volatile memory and/or non-volatile memory. In a number of embodiments, memory system 104 can include a multi-chip device. A multi-chip device can include a number of different memory devices 123, 125, and/or 227, which can include a number of different memory types and/or memory modules. For example, a memory system can include non-volatile or volatile memory on any type of a module. As shown in FIG. 1, the computing system 100 can include a controller 120, which can include a processor 122. Each of the components (e.g., the host 102, the controller 120, the processor 122, and/or the memory devices 123, 125 can be separately referred to herein as an "apparatus."

The memory system 104 can provide main memory for the computing system 100 or could be used as additional memory and/or storage throughout the computing system 100. The memory system 104 can include one or more memory devices 123, 125, which can include volatile and/or non-volatile memory cells. At least one of the memory devices 123, 125 can be a flash array with a NAND architecture, for example. Further, at least one of the memory devices 123, 125 can be a dynamic random-access array of memory cells. Embodiments are not limited to a particular type of memory device. For instance, the memory system 104 can include RAM, ROM, DRAM, SDRAM, PCRAM, RRAM, and/or flash memory (e.g., NAND and/or NOR flash memory devices), among others.

In some embodiments, the memory system 104 can include other non-volatile memory devices 123, 125 such as non-volatile random-access memory devices (e.g., NVRAM, ReRAM, FeRAM, MRAM, PCM), "emerging" memory devices such as resistance variable (e.g., 3-D Crosspoint (3D XP)) memory devices, memory devices that include an array of self-selecting memory (SSM) cells, etc., or any combination thereof.

Resistance variable memory devices can perform bit storage based on a change of bulk resistance, in conjunction with a stackable cross-gridded data access array. Additionally, in contrast to many flash-based memories, resistance variable non-volatile memory can perform a write in-place operation, where a non-volatile memory cell can be programmed without the non-volatile memory cell being previously erased. In contrast to flash-based memories and resistance variable memories, self-selecting memory cells can include memory cells that have a single chalcogenide material that serves as both the switch and storage element for the memory cell.

As shown in FIG. 1, the memory devices 123, 125 can be different types of memory devices. For example, the memory device 125 can be a persistent, non-volatile memory device such as a 3D XP memory device or a NAND memory device, among others, and the memory device 123 can be a non-persistent, volatile memory device, such as a DRAM device, or vice versa. Accordingly, the memory devices 123, 125 can include different media types 124, 126. Embodiments are not so limited, however, and the memory devices 123, 125 can include any type of memory devices provided that at least two of the memory devices 123, 125 include different media types 124, 126. As used herein, a "media type" generally refers to a type of memory cell architecture that corresponds to the memory devices 123, 125. For example, one of the media types 124, 126 can correspond to an array of memory cells that include at least one capacitor and at least one transistor, while another of the media types 124, 126 can include an array of floating-gate metal-oxide-semiconductor field-effect transistors. In some embodiments, at least one of the media types 124, 126 can include an array of resistance variable memory cells that are configured to perform bit storage based on a change in a bulk resistance associated with the resistance variable memory cells.

As illustrated in FIG. 1, a host 102 can be coupled to the memory system 104. In a number of embodiments, the memory system 104 can be coupled to the host 102 via one or more channels (e.g., channel 103). In FIG. 1, the memory system 104 is coupled to the host 102 via channel 103, which can, in addition, be coupled to the controller 120 and/or the processor 122 of the memory system 104. The controller 120 and/or the processor 122 are coupled to the memory devices 123, 125 via channel(s) 105, 107. In some embodiments, each of the memory devices 123, 125 are coupled to the controller 120 and/or the processor 122 by one or more respective channels 105, 107 such that each of the memory devices 123, 125 can receive messages, commands, requests, protocols, or other signaling that is compliant with the type of memory device 123, 125 (e.g., messages, commands, requests, protocols, or other signaling that is compliant with the media type 124, 126 of the memory devices 123, 125) coupled to the controller 120.

The computing system 100 can further include an imaging device 121. The imaging device 121 can be communicatively coupled to the host 102 and/or to the memory system 104 (e.g., to the controller 120 and/or the processor 122). The imaging device 121 can be a camera, sonography device, ultrasound device, stereoscopic imaging device, magnetic resonance imaging device, infrared imaging device, or other imaging device that can capture data that includes images or streams of images (e.g., streaming video and/or "live-streaming video") in real-time and transmit information corresponding to the images and/or streams of images to the computing system 100. In general, the imagining device can be any mechanical, digital, or electronic viewing device; still camera; camcorder; motion picture camera; or any other instrument, equipment, or format capable of recording, storing, or transmitting images, video, and/or information.

As used herein, the term "live-streaming video," and variants thereof, generally refers to sequences of images that are concurrently (or nearly concurrently) captured and processed, reproduced, and/or broadcasted. In some embodiments, "live-streaming" video can be referred to in the alternative herein as "data captured by an imagining device" or "data captured from an imagining device." Further, as used herein, the term "streaming video," and variants thereof generally refers to sequences of images that are captured by an imaging device and subsequently processed, reproduced, and/or broadcasted. In some embodiments, "streaming" video can be referred to in the alternative herein as "data captured by an imagining device" or "data captured from an imagining device."

Generally, such data (e.g., images, streams of images and/or or "live-streaming" video) captured by the imaging device can be displayed or broadcast on a viewing device associated with the computing system 100 (e.g., a display screen of a mobile computing device) and/or processed by a processor (e.g., the processor 122) within a threshold period of time after capture by the imagining device. In some embodiments, the data captured by the imaging device can be displayed, broadcast, and/or processed within a threshold period of time relative to capture of the imaging device that is on the order of seconds or minutes, as opposed to hours or days. These data (e.g., streams of images and/or video) can include any media content live or recorded that is delivered to or by the computing system 100, such as a mobile computing device, via a connection path, such as a wired communication channel, and/or a non-wired communication channel such as the internet and displayed or broadcast in real time. Accordingly, as described in more detail herein, data can be captured by the imaging device 121 and then stored in a memory device 123, 125 coupled to the imaging device 121, processed by a processor 122 associated with the memory device 123, 125, and subsequently broadcast and/or the data can be captured by the imagining device 121, stored in memory device 123, 125 coupled to the imaging device 121, processed by a processor 122 associated with the memory device 123, 125, and/or broadcast in real-time (or near real-time based on latencies in transmission between various components described herein) as the data is captured by the imaging device 121.

In some embodiments, the imaging device 121 can capture data, such as images and/or streaming video (e.g., live-streaming video) that includes images used in performance of navigation assistance operations. As used herein, a "navigation assistance operation" generally refers to one or more operations performed and/or executed by hardware circuitry (e.g., the processor 122, the imaging device 121, and/or at least one of the memory devices 123, 125) to provide routing and/or other navigational information to a user (e.g., a visually impaired user) of the computing system 100. In some embodiments, a navigation assistance operation can be performed through the execution of an application running on the computing system 100.

In some embodiments, the images and/or steaming video captured by the imaging device 121 can include images and/or streaming video of various objects within, or adjacent to, a route generated as part of performance of a navigational assistance operation, among others, some of which may not be immediately recognizable by the computing system 100 and are therefore classified as "unknown objects." As used herein, the term "not immediately recognizable," as well as variants thereof, generally refers to a condition in which an object captured by the imaging device 121 cannot be resolved within a threshold period of time. Whether or not the object can be resolved within the threshold period of time can, in some embodiments, be determined based on a confidence level associated with one or more pixels of the image(s) and/or streaming video. As used herein, the term "confidence level" generally refers to a calculated probability that respective pixels of the image(s) and/or streaming video exhibit a value that is accurate enough for the image to be recognized. If greater than a threshold quantity of pixels of the image(s) and/or streaming video exhibit lower than a particular confidence level, the image(s) and/or streaming video can be classified as "unknown" or as an "unknown object." In addition to, or in the alternative, in some embodiments, whether or not the object can be resolved within the threshold period of time can be determined based on execution of an object recognition model. As used herein, the term "object recognition model" generally refers to instructions that are executed by a computing system to identify one or more objects in digital images and/or streaming video. Execution of an object recognition model can include execution of instructions to detect, classify, and/or localize images and/or streaming-video in order to resolve one or more objects captured in the images and/or streaming-video.

In addition, a determination can be made as to whether the image(s) and/or streaming video may present an impending danger to a user of the computing system 100. For example, it may be determined that the unknown object is traveling at greater than a threshold velocity and/or the that unknown object appears that it will come into contact with the user of the computing system 100 in the absence of actions to re-route the user of the computing system 100 out of the path of the unknown object.

The images and/or streaming video can be captured by the imaging device 121 and processed locally within the memory system 104 as part of the navigational assistance operation (e.g., to provide navigational assistance to a visually impaired person). By utilizing such aspects of the disclosure, navigation assistance can be performed in the absence of transferring the image(s) and/or streaming video to circuitry external to the memory system 104. That is, in some embodiments, the image(s) and/or streaming video captured by the imaging device 121 can be resolved using circuitry associated with the memory system 104 without, for example, encumbering the host 102. By processing the image(s) and/or streaming video within the memory system 104, it may be possible to resolve an unknown object in a shorter time period than in some other approaches, thereby increasing the likelihood that a user of the computing system 100 is re-routed away from the unknown object if the unknown object is determined to present an impending danger to the user of the computing system 100.

Traditionally, capture and processing/analysis of such images and/or streaming videos is a computing resource intensive process. For example, applications and hence, the workloads corresponding thereto to process images and/or streaming video including unknown objects can be extremely computing resource intensive. One reason for this is that the level of detail captured in such images and/or streaming video can be extremely detailed and/or can be received in rapid succession (e.g., in real time) and therefore memory resource intensive (e.g., because of the detail captured in such images and/or videos, the file sizes corresponding to the images and/or videos can be relatively large in comparison to, for example, a simple photograph).

Figure 2:
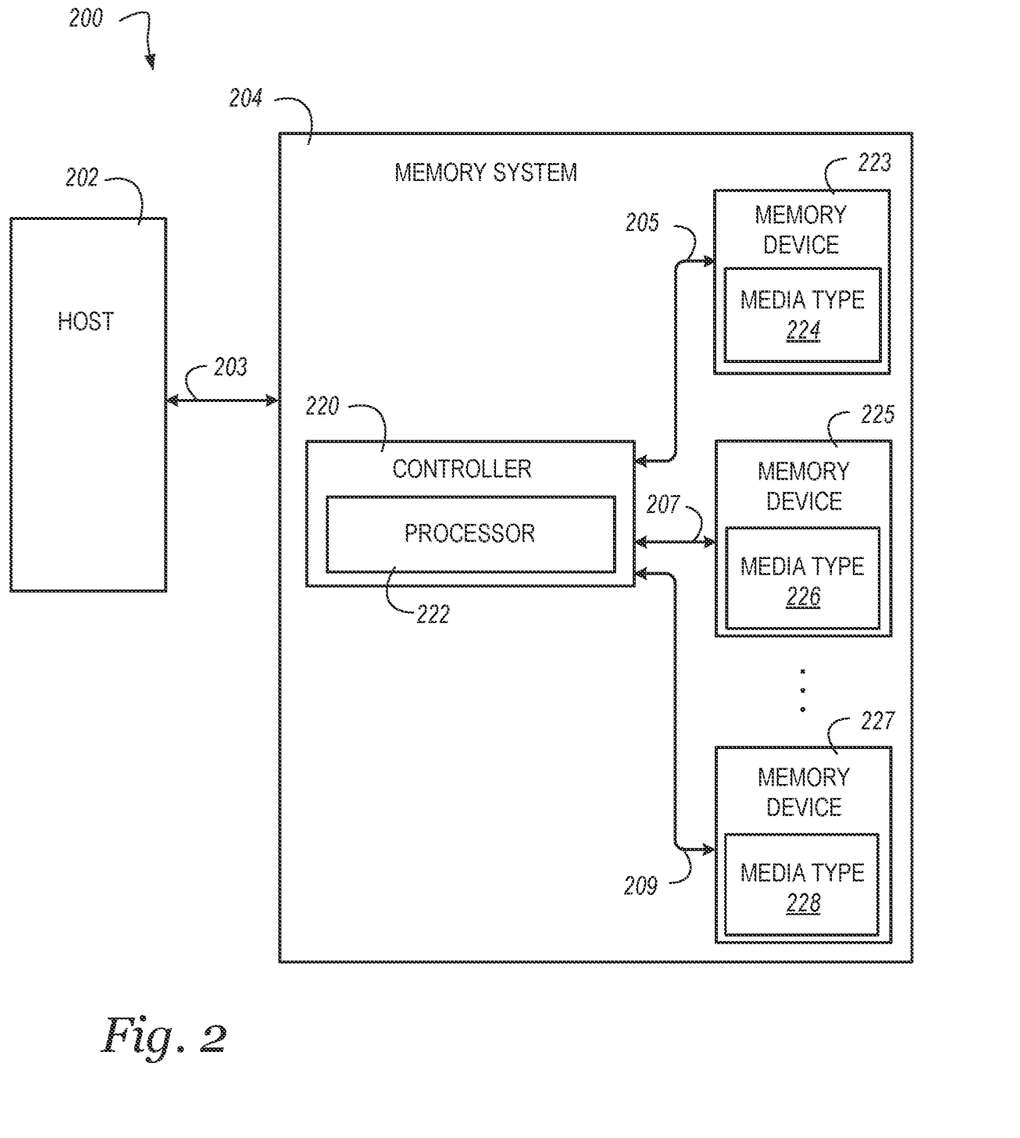
FIG. 2 is another functional block diagram in the form of a computing system including an apparatus including a host and a memory system in accordance with a number of embodiments of the present disclosure.

However, embodiments herein can allow for selective processing of workloads involving images and/or video corresponding to the images and/or video captured by the imaging device 121 such that the workloads corresponding to execution of applications involving the same are allocated to the memory devices 123, 125, 227 to optimize the performance of the memory system 104 such that resolution of unknown objects, as described herein, can be realized using a mobile computing device, such as a smartphone, among other mobile computing devices described herein.

The host 102 can be a host system such as a personal laptop computer, a desktop computer, a digital camera, a smart phone, a memory card reader, and/or an internet-of-things (IoT) enabled device, among various other types of hosts. In some embodiments, however, the host 102 is a mobile computing device such as a digital camera, a smart phone, a memory card reader, and/or an internet-of-things (IoT) enabled device, among various other types of hosts (e.g., in some embodiments, the host 102 is not a personal laptop computer or desktop computer). The host 102 can include a system motherboard and/or backplane and can include a memory access device, e.g., a processor (or processing device).

One of ordinary skill in the art will appreciate that "a processor" can intend one or more processors, such as a parallel processing system, a number of coprocessors, etc. The computing system 100 can include separate integrated circuits or one or more of the host 102, the memory system 104, the control circuitry 120, and/or the memory devices 126-1 to 126-N can be on the same integrated circuit. The computing system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

The memory system 104 can include a controller 120, which can include a processor 122. The processor 122 can be provided in the form of an integrated circuit, such as an application-specific integrated circuit (ASIC), field programmable gate array (FPGA), reduced instruction set computing device (RISC), advanced RISC machine, system-on-a-chip, or other combination of hardware and/or circuitry that is configured to perform operations described in more detail, herein. In some embodiments, the processor 122 can comprise one or more processors (e.g., processing device(s), co-processors, etc.)

The processor 122 can perform operations to monitor and/or determine characteristics of workloads running on the memory system 104. The characteristics can include information such as bandwidth consumption, memory resource consumption, access frequency (e.g., whether the data is hot or cold), and/or power consumption in execution of the workloads, among others. The processor 122 can control writing of at least a portion of the data to a different memory device 123, 125 in order to optimize execution of the workload (e.g., to optimize operations to resolve unknown objects for navigational assistance application for visually impaired people), balance the workload between different memory devices 123, 125 for media management purposes, and/or optimize battery consumption of the computing system 100, among others.

In a non-limiting example, an apparatus (e.g., the computing system 100) can include a first memory device 123 comprising a first type of media 124 and a second memory device 125 comprising a second type of media 126. In some embodiments, the first type of media 124 and the second type of media 126 each comprise sets of memory cells that exhibit different storage characteristics. The first memory device 123, the second memory device 125, and the processor 122 can, in some embodiments, be resident on a mobile computing device (e.g., the mobile computing device 501 illustrated in FIG. 5, herein) such as a smartphone. A processor 122 can be coupled to the first memory device 123 and the second memory device 125. The processor 122 can receive information captured by an imaging device 121 couplable to the processor 122.

As used herein, the term "resident on" refers to something that is physically located on a particular component. For example, the first memory device 123, the second memory device 125, and/or the processor 122 being resident on a smartphone (e.g., the computing system 100 and/or the mobile computing device 501 illustrated in FIG. 5, herein) refers to a condition in which the first memory device 123, the second memory device 125, and/or the processor 122 is physically coupled to, or physically within, smartphone (e.g., the computing system 100 and/or the mobile computing device 501 illustrated in FIG. 5, herein). The term "resident on" may be used interchangeably with other terms such as "deployed on" or "located on," herein.

Figure 5:
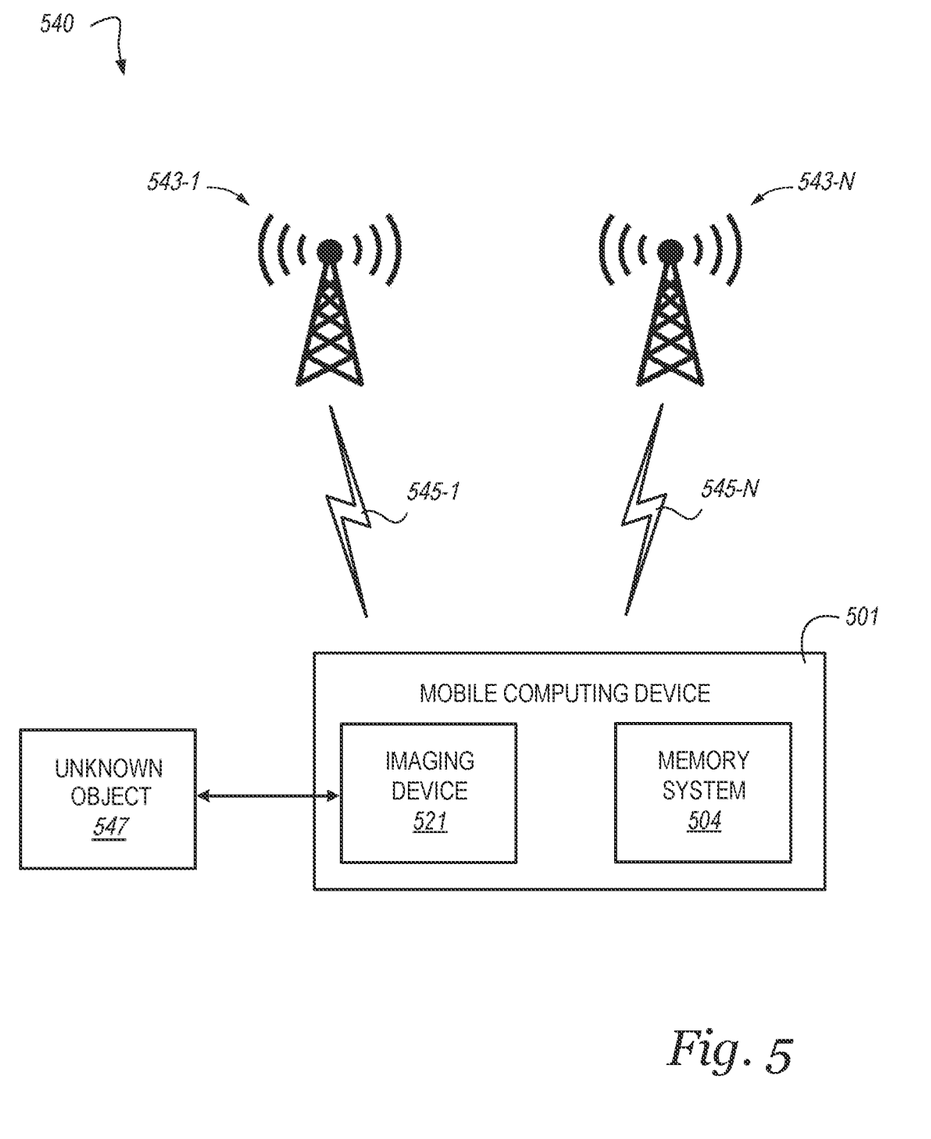
FIG. 5 is a diagram illustrating a mobile computing device and an unknown object in accordance with a number of embodiments of the present disclosure.

The processor 122 can execute an operation to determine that an image captured by an imaging device 121 coupled to the processor 122 contains an unknown object (e.g., the unknown object 547 illustrated in FIG. 5, herein). The processor 122 can determine, based at least in part on a determined confidence level associated with the image, that the unknown object is not resolvable within a threshold period of time. In some embodiments, the processor 122 can determine, based at least in part on an object recognition model executed by the processor, that the unknown object is not resolvable within a threshold period of time.

The processor 122 can perform an operation to reallocate computing resources between the first memory device 123 and the second memory device 125 in response to determining that the unknown object is not resolvable within the threshold period of time. Continuing with this example, the processor 122 can write at least a portion of data associated with the unknown object to the reallocated resources of the first memory device 123 and/or or the second memory device 125 and perform, using the reallocated computing resources, an operation involving the data corresponding to the unknown object to resolve the unknown object. In some embodiments, the processor 122 can execute instructions corresponding to one or more machine learning operations as part of performance of the operation to resolve the unknown object.

As described above, the first memory device or the second memory device can be a non-persistent (e.g., volatile) memory device and the other of the first memory device or the second memory device can be a persistent (e.g., non-volatile) memory device. For example, in some embodiments, the first memory device or the second memory device can be a NAND flash memory device that comprises a set of single level memory cells (SLCs) and a set of multi-level memory cells (MLCs) while the other of the first memory device or the second memory device can be a DRAM memory device. In such embodiments, the processor 122 can write the data corresponding to the unknown object to the set of SLC memory cells and/or the DRAM memory device as part of the operation to resolve the unknown object.

As described above, the processor 122, the first memory device 123, and the second memory device 125 can be resident on a mobile computing device (e.g., the mobile computing device 501 illustrated in FIG. 5, herein). In some embodiments, the processor 122 can determine that the mobile computing device has experienced a handoff from a first base station to a second base station (e.g., the first base station 543-1 and the second base station 543-N illustrated in FIG. 5, herein) and perform the operation to reallocate computing resources between the first memory device 123 and the second memory device 125 responsive to the determination that the mobile computing device has experienced the handoff. For example, the processor 122 can reallocate or pre-allocate the computing resources between the first memory device 123 and the second memory device 125 based a determination that the mobile computing device has moved or, is going to move, from an area that receives network coverage from a base station to an area that receives network coverage from a different base station.

As used herein, the term "network coverage," particular in the context of network coverage from a base station, generally refers to a geographical area that is characterized by the presence of electromagnetic radiation (e.g., waves having a particular frequency range associated therewith) generated by a base station. As used herein, a "base station" generally refers to equipment that generate and receive electromagnetic radiation within a particular frequency range and facilitate transfer of data or other information between the base station and computing devices (e.g., mobile computing devices such as smartphones, etc.) that are within the network coverage area of the base station. Several non-limiting examples of frequency ranges that a base station can generate and receive can include 700 MHZ-2500 MHZ (in the case of a 4G base station) or 28 GHz-39 GHz (in the case of a 5G base station).

In some embodiments, the processor 122 can determine that the unknown object presents an impending danger to a user of the mobile computing device and/or determine that the unknown object cannot be resolved within a threshold period of time corresponding to the user coming into contact with the unknown object. In response to such a determination, the processor 122 can update route information associated with the mobile computing device to route the user of the mobile computing device away from the unknown object.

In some embodiments, the processor 122 can determine characteristics of the workload when the workload is written to the first memory device 123 or the second memory device 125. As described herein, the characteristics of the workload can include at least one of an access frequency of data associated with the workload, a latency associated with execution of the workload, and/or an amount of processing resources consumed in execution of the workload. In some embodiments, the application and/or the workload can involve processing of data received and/or captured by the imaging device 121, for example as part of an operation to resolve an unknown object that is determined to present an impending danger to a user of a mobile computing device in which the processor 122 is disposed. By determining the characteristics of such workloads when executed by different memory devices, the processor 122 can determine which memory devices to write data corresponding to the unknown object to in order to perform operations to quickly and accurately resolve the unknown object.

The embodiment of FIG. 1 can include additional circuitry that is not illustrated so as not to obscure embodiments of the present disclosure. For example, the memory system 104 can include address circuitry to latch address signals provided over I/O connections through I/O circuitry. Address signals can be received and decoded by a row decoder and a column decoder to access the memory system 104 and/or the memory devices 123, 125. It will be appreciated by those skilled in the art that the number of address input connections can depend on the density and architecture of the memory system 104 and/or the memory devices 123, 125.

FIG. 2 is another functional block diagram in the form of a computing system 200 including an apparatus including a host 202 and a memory system 204 in accordance with a number of embodiments of the present disclosure. In some embodiments, the computing system 200 can be a mobile computing system (e.g., a mobile computing device 501, such as a smartphone, a tablet, a phablet, and/or a IoT device, among others). The memory system 204 can include a number of different memory devices 223, 225, 227, which can include one or more different media types 223, 225, 227. The different memory devices 223, 225, and/or 227 can include one or more memory modules (e.g., single in-line memory modules, dual in-line memory modules, etc.). The host 202, memory system 204, controller 220, processor 222, memory devices 223, 225 and/or the media types 224, 226 can be analogous to the host 102, memory system 104, controller 120, processor 122, memory devices 123, 125 and/or the media types 124, 126 illustrated in FIG. 1, herein.

In some embodiments, each of the memory devices 223, 225, and 227 can be different types of memory devices. Accordingly, in some embodiments, each of the memory devices 223, 225, and 227 can include different media types 224, 226, and 228. In a non-limiting example, the memory device 223 can be a volatile memory device, such as a DRAM device and can include a media type 224 that corresponds to a DRAM memory device (e.g., an array of memory cells that include at least one capacitor and at least one transistor). Continuing with this example, the memory device 225 can be a flash memory device, such as a NAND memory device and can include a media type 226 that corresponds to a NAND memory device (e.g., comprises an array of floating-gate metal-oxide-semiconductor field-effect transistors). In this non-limiting example, the memory device 227 can be an emerging memory device (e.g., the emerging memory device 439 illustrated in FIG. 4, herein), such as the emerging memory devices described above, and can include a media type 228 that corresponds to an emerging memory device (e.g., an array of resistance variable memory cells that are configured to perform bit storage based on a change in a bulk resistance associated with the resistance variable memory cells).

The memory devices 223, 225, and 227 can be configured to read, write, and/or store data corresponding to one or more workloads executed by the computing system 200. An application corresponding to the workload can be executed by, for example, the processor 222 to cause data written to the memory devices 223, 225, and 227 to be used in execution of the application and/or workload (e.g., an application and/or workload associated with providing navigational assistance for a visually impaired person). As described above, the controller 220 can control writing at least a portion of the data to a different memory device than the memory device in which the data is initially written based on characteristics of the workload.

For example, if data corresponding to a workload corresponding to a navigation assistance application is stored in the memory device 223, the controller 220 and/or the processor 222 can, in response to a determination that the workload may be more efficiently executed (e.g., optimized) using a different memory device, cause at least a portion of the data corresponding to the particular workload to be written to the memory device 225 and/or to the memory device 227. In some embodiments, causing the data corresponding to the particular workload to be written to the memory devices 223, 225 and/or 227 can include writing data corresponding to an unknown object to at least one of the memory devices 223, 225, and/or 227 in order to optimize processing of the data corresponding to the unknown object to resolve the unknown object in a most efficient manner.

In a non-limiting example, a system (e.g., the computing system 200 and/or the mobile computing device 501 illustrated in FIG. 5, herein) can include a memory system 204 comprising a processor 222, a first memory device 223 comprising a first type of media 224, a second memory device 225 comprising a second type of media 226, and a third memory device 227 comprising a third type of media 228. In some embodiments, the first memory device 223 can be a dynamic random-access memory device, the second memory device 225 can be a NAND flash memory device, and the third memory device 227 can be an emerging memory device, such as a 3D XP memory device, a self-selecting cell memory device, etc., as described above.

In at least one embodiment, the media type 224 comprises an array of memory cells that include at least one capacitor and at least one transistor, the media type 226 comprises an array of floating-gate metal-oxide-semiconductor field-effect transistors, and the type of media 228 comprises an array of resistance variable memory cells that are configured to perform bit storage based on a change in a bulk resistance associated with the resistance variable memory cells.

An imaging device (e.g., the imaging device 121 illustrated in FIG. 1, herein) can be coupled to the memory system 204. In this example, the processor 222 can receive an image captured by an imaging device coupled to the processor 222 that contains greater than a threshold quantity of unidentifiable pixels. The processor 222 can classify the captured image as an image that contains an unknown object based on the image containing greater than the threshold quantity of unidentifiable pixels. In some embodiments, the processor 222 can determine that the quantity of unidentifiable pixels are not resolvable within a first threshold period of time, based at least in part, on an object recognition model executed by the processor and/or a determined confidence level associated with the captured image, as described herein.

Continuing with this example, the processor 222 can determine that the unknown object presents an impending danger to a user of the mobile computing device. As described above, whether the unknown object presents an impending danger to the user of the mobile computing device can be based on the trajectory and/or velocity of the unknown object, among other factors. The processor 222 can reallocate computing resources amongst the first memory device, the second memory device, or the third memory device, or any combination thereof in response to the determination that the quantity of unidentifiable pixels are not resolvable within the first threshold period of time and/or the determination that the unknown object presents an impending danger to the user of the mobile computing device. The first period of time can, in some embodiments, include a period of time within which the unknown object must be identified to allow the user of the mobile computing device to safely navigate away from any impending danger presented by the unknown object.

In some embodiments, the processor 222 can perform, using the reallocated computing resources, an operation involving the unidentifiable pixels corresponding to the unknown object to resolve the unknown object and determine, within a second threshold period of time, whether the operation to resolve the unknown object is successful. If the unknown object is resolved, the processor 222 can notify the user of the mobile computing device that the unknown object is resolved in response to a determination that the operation to resolve the unknown object is successful within the second threshold period of time. The second threshold period of time can, in some embodiments, include a period of time allowed for resolution of the unknown object using the reallocated computing resources to allow the user of the mobile computing device to safely navigate away from any impending danger presented by the unknown object.

If, however, the unknown object is not resolved within the second threshold period of time, the processor 222 can update route information associated with the mobile computing device to route the user of the mobile computing device away from the unknown object in response to a determination that the operation to resolve the unknown object is unsuccessful within the second threshold period of time.

As mentioned above, in some embodiments, at least one of the first memory device 223, the second memory device 225, or the third memory device 227 comprises a flash memory device, at least one of the first memory device 223, the second memory device 225, or the third memory device 227 comprises a dynamic random-access memory device, and at least one of the first memory device 223, the second memory device 225, or the third memory device 227 comprises a resistance variable memory device.

In some embodiments, the processor 222 can determine that the first memory device 223 or the second memory device 225 or the third memory device 227 exhibits a higher bandwidth than another of the first memory device 223 or the second memory device 225 or the third memory device 227. In such embodiments, the processor 222 can perform the operation to reallocate computing resources amongst the first memory device 223, the second memory device 225, and/or the third memory device 227 such that greater than a threshold amount of memory that exhibits the higher bandwidth is available to perform the operation to resolve the unknown object or greater than a threshold amount of memory that exhibits the faster memory access time is available to perform the operation to resolve the unknown object. The processor 222 can then perform, using the reallocated computing resources, the operation involving the unidentifiable pixels corresponding to the unknown object to resolve the unknown object using the first memory device 223, the second memory device 225, and/or the third memory device 227 that exhibits the higher bandwidth to perform the operation to resolve the unknown object and/or the faster memory access time to perform the operation to resolve the unknown object.

As described in more detail in connection with FIG. 5, herein, the processor 222 can determine that the mobile computing device has experienced a handoff from a first base station (e.g., the base station 543-1 illustrated in FIG. 5, herein) to a second base station (e.g., the base station 543-N illustrated in FIG. 5, herein). As used herein, the term "handoff" generally refers to transfer of network coverage from one base station to another. For example, as the mobile computing device moves from one locale to another, the mobile computing device may exit a network coverage zone provided by the first base station and may enter a network coverage zone provided by a second base station. When the mobile computing device begins to receive network coverage from the second station as opposed to the first base station, a handoff can be said to have occurred. Responsive to the determination that the mobile computing device has experienced the handoff between the first base station and the second base station, the processor 222 can perform the operation to reallocate computing resources between the first memory device and the second memory device responsive to the determination that the mobile computing device has experienced the handoff.

As described above, in some embodiments, the processor 222 can perform the operation involving the unidentifiable pixels corresponding to the unknown object to resolve the unknown object as part of execution of instructions to assist a visually impaired user of the mobile computing device. Accordingly, in some embodiments, the processor 222 can generate vibrational patterns corresponding to navigation in the presence of the unknown object and/or voice-assisted navigation updates corresponding to navigation in the presence of the unknown object, as described in connection with FIG. 6, herein.

In some embodiments, at least a portion of the data written to the memory device 223, the memory device 225, or the memory device 227 (e.g., data corresponding to an unknown object) is formatted according to a universal number format or a posit format. In contrast to the IEEE 754 floating-point or fixed-point binary formats, which include a sign bit sub-set, a mantissa bit sub-set, and an exponent bit sub-set, universal number formats, such as posits include a sign bit sub-set, a regime bit sub-set, a mantissa bit sub-set, and an exponent bit sub-set. This can allow for the accuracy, precision, and/or the dynamic range of a posit to be greater than that of a float, or other numerical formats. In addition, posits can reduce or eliminate the overflow, underflow, NaN, and/or other corner cases that are associated with floats and other numerical formats. Further, the use of posits can allow for a numerical value (e.g., a number) to be represented using fewer bits in comparison to floats or other numerical formats. Accordingly, embodiments herein can allow for data corresponding to the unknown object to be converted to a posit format to facilitate efficient processing and resolution of the unknown object.

As used herein, a "precision" refers to a quantity of bits in a bit string that are used for performing computations using the bit string. For example, if each bit in a 16-bit bit string is used in performing computations using the bit string, the bit string can be referred to as having a precision of 16 bits. However, if only 8-bits of a 16-bit bit string are used in performing computations using the bit string (e.g., if the leading 8 bits of the bit string are zeros), the bit string can be referred to as having a precision of 8-bits. As the precision of the bit string is increased, computations can be performed to a higher degree of accuracy. Conversely, as the precision of the bit string is decreased, computations can be performed using to a lower degree of accuracy. For example, an 8-bit bit string can correspond to a data range consisting of two hundred and fifty-five (256) precision steps, while a 16-bit bit string can correspond to a data range consisting of sixty-five thousand five hundred and thirty-six (63,536) precision steps.

As used herein, a "dynamic range" or "dynamic range of data" refers to a ratio between the largest and smallest values available for a bit string having a particular precision associated therewith. For example, the largest numerical value that can be represented by a bit string having a particular precision associated therewith can determine the dynamic range of the data format of the bit string. For a universal number (e.g., a posit) format bit string, the dynamic range can be determined by the numerical value of the exponent bit sub-set of the bit string.

A dynamic range and/or the precision can have a variable range threshold associated therewith. For example, the dynamic range of data can correspond to an application that uses the data and/or various computations that use the data. This may be due to the fact that the dynamic range desired for one application may be different than a dynamic range for a different application, and/or because some computations may require different dynamic ranges of data. Accordingly, embodiments herein can allow for the dynamic range of data to be altered to suit the requirements of disparate applications and/or computations, such as resolution of unknown object captured by an imaging device in the context of providing safe navigation to a visually impaired person. In contrast to approaches that do not allow for the dynamic range of the data to be manipulated to suit the requirements of different applications and/or computations, embodiments herein can improve resource usage and/or data precision by allowing for the dynamic range of the data to varied based on the application and/or computation for which the data will be used.

Figure 3:
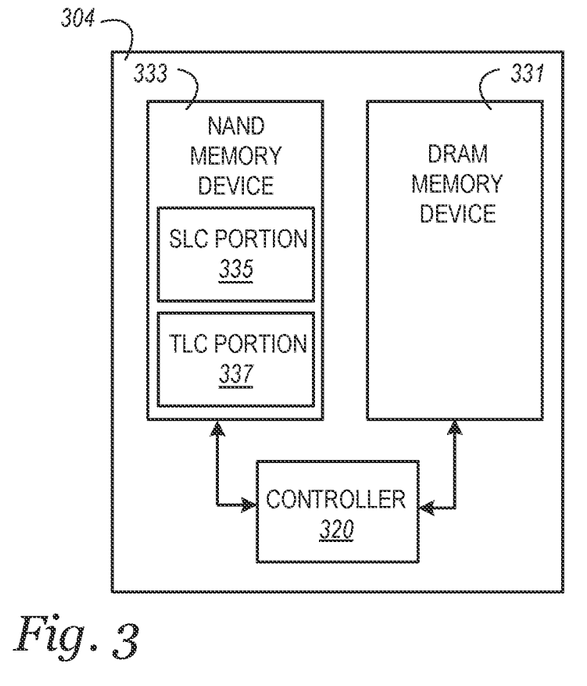
FIG. 3 is a functional block diagram in the form of an apparatus including a memory system in accordance with a number of embodiments of the present disclosure.

FIG. 3 is a functional block diagram in the form of an apparatus including a memory system 304 in accordance with a number of embodiments of the present disclosure. FIG. 3 illustrates a memory system 304, which can be analogous to the memory system 104 illustrated in FIG. 1 and/or the memory system 204 illustrated in FIG. 2, herein. As shown in FIG. 3, the memory system 304 includes a controller 320 (which can be analogous to the controller 120 illustrated in FIG. 1 and/or the controller 220 illustrated in FIG. 2, herein), a DRAM memory device 331 (which can be analogous to one of the memory devices 123, 125 illustrated in FIG. 1 and/or one of the memory devices 223, 225, 227 illustrated in FIG. 2, herein), and a NAND memory device 333 (which can be analogous to one of the memory devices 123, 125 illustrated in FIG. 1 and/or one of the memory devices 223, 225, 227 illustrated in FIG. 2, herein).

As shown in FIG. 3, the NAND memory device 333 can include various portions of memory cells, which can include a set of single level memory cells (SLCs) 335 and a set of triple-level memory cells (TLCs) 337. Although shown including SLCs 335 and TLCs 337, embodiments are not so limited and the NAND memory device 333 can include one or more sets of multi-level cells (MLCs), one or more sets of quad-level cells (QLCs), etc. As described above, in some embodiments, the controller 320 can cause at least a portion of data corresponding to an unknown object processed by the memory system 304 as part of execution of a navigation assistance application to be written to the SLC portion 335 and/or or the TLC portion 337 in order to resolve the unknown object as accurately and quickly as possible.

In some embodiments, data that is classified as hot data can be written to the SLC portion 335 while data that is classified as cold data can be written to the TLC portion 337, or vice versa, as part of optimizing performance of the memory system 304 during execution of a workload corresponding to a navigational assistance application. By selectively writing portions of data involved in the workload to different memory portions (e.g., to a SLC portion 335 and/or a TLC portion 337) of the NAND memory device 333, performance of the computing system, especially during execution of workloads corresponding to navigation assistance applications described herein, can be improved in comparison to some approaches. Embodiments are not so limited, however, and in some embodiments, hot data can be written to the DRAM memory device, colder data can be written to the NAND memory device 333, and cold data can be written to the emerging memory device (e.g., the emerging memory device 439 illustrated in FIG. 4, herein).

For example, by selectively writing portions of data that correspond to workloads that benefit from rapid execution (e.g., operations to resolve an unknown object that presents an impending danger to a visually impaired person) to the DRAM memory device 331 while writing portions of data that correspond to workloads that may not benefit as much from rapid execution to the SLC portion 335 and/or the TLC portion 337, and/or to the emerging memory device (e.g., the emerging memory device 439 illustrated in FIG. 4, herein), workloads can be allocated to memory devices within the memory system 304 that can allow for optimized execution of the workloads within the memory system 304. For similar reasons, portions of the workloads can be written to an emerging memory device (e.g., the emerging memory device 439 illustrated in FIG. 4, herein).

Figure 4:
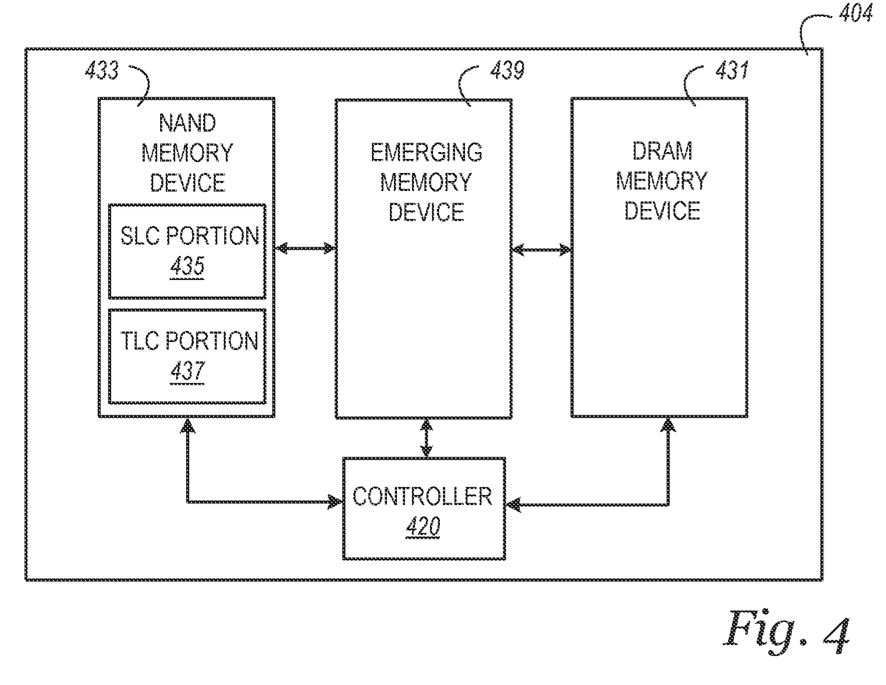
FIG. 4 is another functional block diagram in the form of an apparatus including a memory system in accordance with a number of embodiments of the present disclosure.

FIG. 4 is another functional block diagram in the form of an apparatus including a memory system 404 in accordance with a number of embodiments of the present disclosure. FIG. 4 illustrates a memory system 404, which can be analogous to the memory system 104 illustrated in FIG. 1, the memory system 204 illustrated in FIG. 2, and/or the memory system 304 illustrated in FIG. 3, herein.

As shown in FIG. 4, the memory system 404 includes a controller 420 (which can be analogous to the controller 120 illustrated in FIG. 1, the controller 220 illustrated in FIG. 2, and/or the controller 320 illustrated in FIG. 3, herein), a DRAM memory device 431 (which can be analogous to one of the memory devices 123, 125 illustrated in FIG. 1, one of the memory devices 223, 225, 227 illustrated in FIG. 2, and/or one of the DRAM memory device 331 illustrated in FIG. 3, herein), a NAND memory device 433 (which can be analogous to one of the memory devices 123, 125 illustrated in FIG. 1, one of the memory devices 223, 225, 227 illustrated in FIG. 2, and/or the NAND memory device 333 illustrated in FIG. 3, herein), and an emerging memory device 439 (which can be analogous to one of the memory devices 123, 125 illustrated in FIG. 1 and/or one of the memory devices 223, 225, 227 illustrated in FIG. 2, herein).

The DRAM memory device 431 can include an array of memory cells that include at least one transistor and one capacitor configured to store a charge corresponding to a single data bit. The NAND memory device 433 can include various portions of memory cells, which can include a set of single level memory cells (SLCs) 435 and a set of multi-level memory cells (MLCs), such as a set of triple-level memory cells (TLCs) 437, which can be analogous to the SLC portion 335 and the TLC portion 337, respectively, illustrated and described in connection with FIG. 3, herein.

The emerging memory device 439 can be an emerging memory device, as described above. For example, the emerging memory device 439 can be a resistance variable (e.g., 3-D Crosspoint (3D XP)) memory devices, memory devices that include an array of self-selecting memory (SSM) cells, etc., or any combination thereof.

As described above, by selectively writing portions of data that correspond to workloads that benefit from rapid execution (e.g., operations executed by applications to resolve an unknown object that presents an impending danger to a visually impaired person) to the DRAM memory device 431 while writing portions of data that correspond to workloads that may not benefit as much from rapid execution to the SLC portion 435 and/or the TLC portion 437, and/or to the emerging memory device 439 (e.g., workloads that correspond to applications that may not be useful to identify and resolve an object that may present an impending danger to a visually impaired person), workloads can be allocated to memory devices within the memory system 404 that can allow for optimized execution of the workloads within the memory system 404. For similar reasons, portions of any workload encumbering the memory system 404 can be written to an emerging memory device 439 to facilitate performance of the embodiments described herein.

FIG. 5 is a diagram illustrating a mobile computing device 501 and an unknown object 547 in accordance with a number of embodiments of the present disclosure. As shown in FIG. 5, the mobile computing device 501 includes an imaging device 521, which can be analogous to the imaging device 121 illustrated in FIG. 1, herein and a memory system 504, which can be analogous to the memory system 104, 204, 304, 404 illustrated in FIGS. 1-4, herein. In some embodiments, the mobile computing device 501 can be analogous to the computing system 100 and/or the computing system 200 illustrated in FIGS. 1 and 2, respectively, herein.

The mobile computing device 501 can be in communication with a base station (e.g., the base station 543-1 or the base station 543-N) via a one or more communications paths 545-1 to 545-N. In general, the communication paths 545-1 to 545-N can be wireless communication paths that transmit information via electromagnetic radiation at particular frequencies, as described above. The mobile computing device 501 can, in some embodiments, receive information corresponding to the unknown object 547 from at least one of the base stations 543-1 to 543-N via the communication path(s) 545-1 to 545-N.

For example, the base stations 543-1 to 543-N may have previously received information corresponding to the unknown object 547 from other mobile computing devices that have encountered the unknown object 547 and/or other mobile computing devices that have been in communication with the base stations 543-1 to 543-N. In such embodiments, the mobile computing device 501 (e.g., a processor of the mobile computing device 501, such as the processors 122 and/or 222 illustrated in FIGS. 1 and 2, respectively, herein) can perform, using the reallocated (or pre-allocated) computing resources, operations involving the data corresponding to the unknown object and/or the received information corresponding to the unknown object 547 to resolve the unknown object 547.

In some embodiments, the mobile computing device 501 can receive confidence information regarding at least one pixel of an image stored by the base stations 543-1 to 543-N as part of receiving the information corresponding to the unknown object 547 from the base stations 543-1 to 543-N when the image stored by the base station is determined to be similar to the unknown object 547. For example, if the mobile computing device 501 and/or the base stations 543-1 to 543-N determine that an image stored by the base stations 543-1 to 543-N or the mobile computing device 501 is similar to the unknown object 547, the base stations 543-1 to 543-N or the mobile computing device 501 can generate information corresponding to how confident the base stations 543-1 to 543-N and/or the mobile computing device 501 is that one or more pixels of the similar image correspond to the unknown object 547.

As shown in FIG. 5, the imaging device 521 can receive information (e.g., images and/or live-streaming video) related to the unknown object 547. The information can be processed and/or analyzed within the mobile computing device 501 for example, using the memory system 504 resident on the mobile computing device 501. In some embodiments, the information (e.g., the images and/or the live-streaming video) can be processed by the mobile computing device 501 as part of execution of a navigational assistance operation and/or application that provides navigational assistance to the visually impaired.

The information related to the unknown object 547 can be processed by the mobile computing device 501 in connection with execution of one or more applications (e.g., applications related to navigation assistance) running on the mobile computing device 501. As described above, execution of such applications can give rise to demanding workloads. Accordingly, as described herein, the information can be selectively written to different memory devices (e.g., the memory devices 223, 225, and/or 227 illustrated in FIG. 2, herein), and therefore different media types (e.g., the media types 224, 226, and/or 228 illustrated in FIG. 2, herein) based on characteristics of the workloads to optimize execution of high-priority operations, such as resolving an unknown object that presents an impending danger to a visually impaired user of the mobile computing device 501.

In some embodiments, the images and/or video can be processed and/or analyzed by the mobile computing device 501 during execution of an application to analyze the unknown object 547 illustrated in FIG. 5. In addition, the images and/or video can be processed and/or analyzed by the mobile computing device 501 to detect and/or replace one or more corrupted portions (e.g., pixels) of the images and/or video to recover and/or improve the quality of the images and/or video as part of performing operations to resolve the unknown object.

Figure 6:
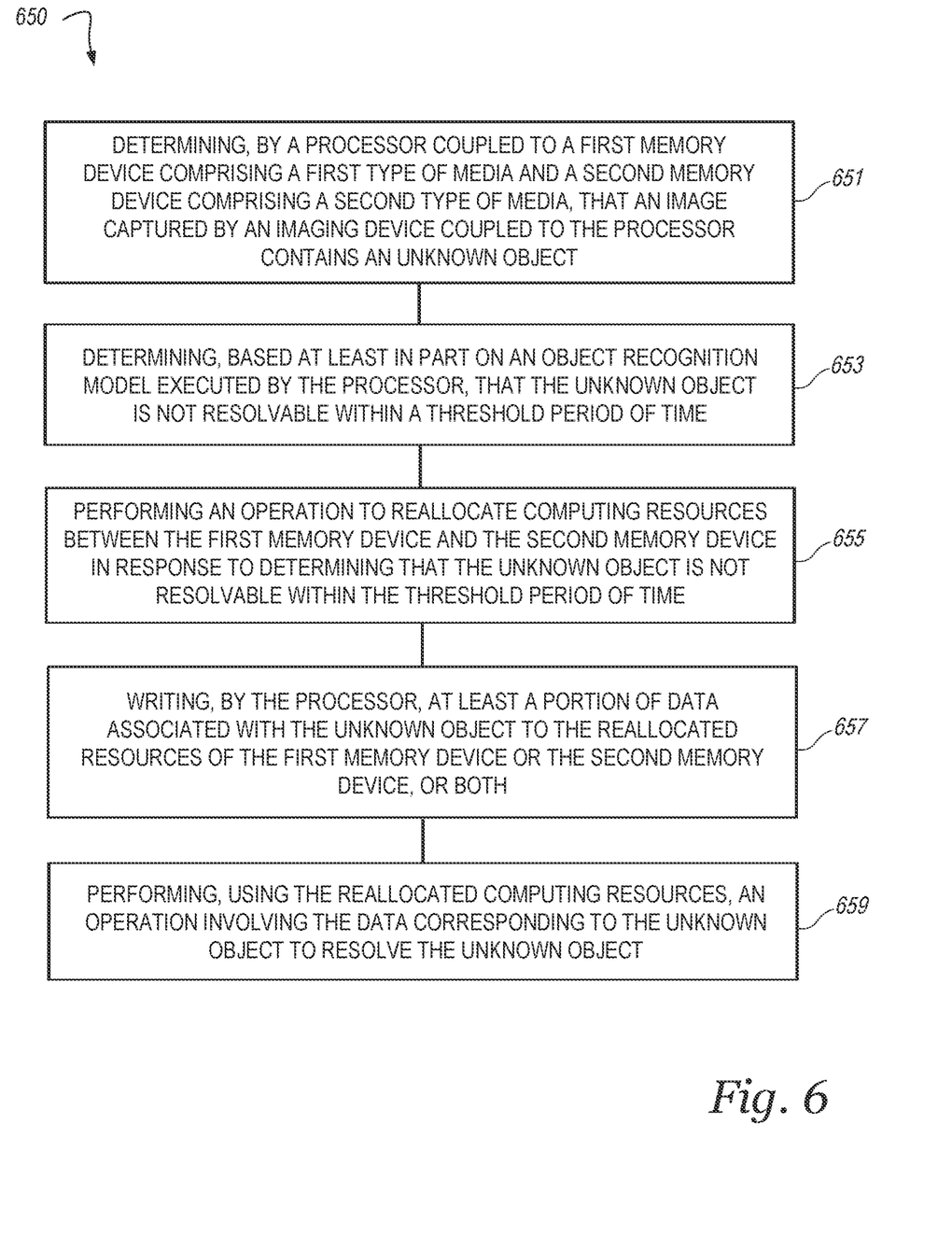
FIG. 6 is a flow diagram representing an example method corresponding to navigational assistance for the visually impaired in accordance with a number of embodiments of the present disclosure.

FIG. 6 is a flow diagram representing an example method corresponding to navigational assistance for the visually impaired in accordance with a number of embodiments of the present disclosure. The method 650 can be performed by processing logic that can include hardware (e.g., processor(s), processing device(s), control circuitry, dedicated logic, programmable logic, microcode, hardware of a device, and/or integrated circuit(s), etc.), software (e.g., instructions run or executed on a processor), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 651, the method 650 can include determining, by a processor coupled to a first memory device comprising a first type of media and a second memory device comprising a second type of media, that an image captured by an imaging device coupled to the processor contains an unknown object. The processor can be analogous to the processor 122, 222 illustrated in FIGS. 1 and 2, herein. The first memory device can be analogous to the memory device 123, 223, while the second memory device can be analogous to the memory device 125, 225 illustrated in FIGS. 1 and 2, herein. Further, the first type of media can be analogous to the media type 124, 224, while the second type of media can be analogous to the media type 126, 226 illustrated in FIGS. 1 and 2, herein. The imaging device can be analogous to the imaging device 121, 521 illustrated in FIGS. 1 and 5, herein.

At block 653, the method 650 can include determining, based at least in part on an object recognition model executed by the processor, that at least a portion of the unknown object represents an object to be resolved that is not resolvable within a threshold period of time. Accordingly, in some embodiments, the method 650 can include determining that the unknown object is not resolvable within a threshold period of time. Embodiments are not so limited, however, and as described above, in some embodiments the method 650 can include determining, based at least in part on a determined confidence level associated with the image, that the unknown object is not resolvable within a threshold period of time.

At block 655, the method 650 can include performing an operation to reallocate computing resources between the first memory device and the second memory device in response to determining that the unknown object is not resolvable within the threshold period of time. In some embodiments, the method 650 can include determining that the first memory device or the second memory device has a higher bandwidth than the other of the first memory device or the second memory device. In such embodiments, the operation to reallocate computing resources between the first memory device and the second memory device can include reallocating the computing resources such that greater than a threshold amount of memory that has the higher bandwidth is available to perform the operation to resolve the unknown object. Embodiments are not so limited, however, and in some embodiments, the method 650 can include determining that the first memory device or the second memory device has a faster memory access time than the other of the first memory device or the second memory device and the operation to reallocate computing resources between the first memory device and the second memory device can include reallocating the computing resources such that greater than a threshold amount of memory that has the faster memory access time is available to perform the operation to resolve the unknown object.

At block 657, the method 650 can include writing, by the processor, at least a portion of data associated with the unknown object to the reallocated resources of the first memory device or the second memory device, or both. In some embodiments, at least the portion of the data can be written to the first memory device or the second memory device that exhibits the highest bandwidth, the fastest access time, etc.

At block 659, the method 650 can include performing, using the reallocated computing resources, an operation involving the data corresponding to the unknown object to resolve the unknown object. Operations to resolve the unknown object can include performance of various machine learning operations to determine similarities between the unknown object and other objects known to the mobile computing device. Embodiments are not so limited, however, and in some embodiments, operations to resolve the unknown object can include replacement of one or more pixels of an image of the unknown object and/or polling a base station and/or other mobile computing device in the area to determine if the unknown object is recognized by the base station and/or the other mobile computing device.

As described above, the processor, the first memory device, and the second memory device can be resident on a mobile computing device (e.g., the mobile computing device 501 illustrated in FIG. 5, herein). In such embodiments, the method 650 can include determining that the unknown object presents an impending danger to a user of the mobile computing device and updating route information associated with the mobile computing device to route the user of the mobile computing device away from the unknown object. Embodiments are not so limited, however, and in some embodiments, the method 650 can include determining that the unknown object cannot be resolved within a threshold period of time corresponding to a user of the mobile computing device coming into contact with the unknown object and updating route information associated with the mobile computing device to route the user of the mobile computing device away from the unknown object.

In some embodiments, the method 650 can include determining that the processor is receiving network coverage from a first base station (e.g., the base station 543-1 illustrated in FIG. 5, herein) and determining that the processor has moved to a different geographical location and is receiving network coverage from a second base station (e.g., the base station 543-N illustrated in FIG. 5, herein). In such embodiments, the method 650 can include performing the operation to reallocate computing resources between the first memory device and the second memory device in response to determining that the processor is receiving network coverage from the second base station.

The method 650 can further include generating vibrational patterns corresponding to navigation in the presence of the unknown object and/or voice-assisted navigation updates corresponding to navigation in the presence of the unknown object. In some embodiments, the vibrational patterns can be generated such that portions of the mobile computing device vibrate and/or voice-assisted navigation updates are projected by the mobile computing device to indicate a direction in which a user of the mobile computing device should move in order to avoid contact with the unknown object.

As described above, the first memory device or the second memory device can be a non-persistent memory device, and the other of the first memory device or the second memory device can be a persistent memory device. In some embodiments, the processor, the first memory device, and the second memory device can be resident on a mobile computing device (e.g., the mobile computing device 501 illustrated in FIG. 5, herein). In such embodiments, the method 650 can include determining, writing, and causing, by the processor in the absence of control signals generated external to the mobile computing device. Embodiments are not so limited, and in some embodiments, the method 650 can include writing at least the portion of data associated with the workload to the other of the first memory device or the second memory device as part of an operation to optimize resolution of the unknown object and/or to optimize battery consumption of the mobile computing device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   determining, by a processor coupled to a first memory device comprising a first type of media and a second memory device comprising a second type of media, that an image captured by an imaging device coupled to the processor contains an unknown object;
   determining, based at least in part on an object recognition model executed by the processor, that at least a portion of the unknown object represents an object to be resolved that is not resolvable within a threshold period of time;
   performing an operation to reallocate computing resources between the first memory device and the second memory device in response to determining that the unknown object is not resolvable within the threshold period of time;
   writing, by the processor, at least a portion of data associated with the unknown object to the reallocated computing resources of the first memory device or the second memory device, or both; and
   performing, using the reallocated computing resources, an operation involving the data corresponding to the unknown object to resolve the unknown object.

2. The method of claim 1, further comprising determining, based at least in part on a determined confidence level associated with the image, that the unknown object is not resolvable within the threshold period of time.

3. The method of claim 1, further comprising determining that the first memory device or the second memory device has a higher bandwidth than the other of the first memory device or the second memory device, wherein
the operation to reallocate computing resources between the first memory device and the second memory device comprises reallocating the computing resources such that greater than a threshold amount of memory that has the higher bandwidth is available to perform the operation to resolve the unknown object.

4. The method of claim 1, further comprising determining that the first memory device or the second memory device has a faster memory access time than the other of the first memory device or the second memory device, wherein
the operation to reallocate computing resources between the first memory device and the second memory device comprises reallocating the computing resources such that greater than a threshold amount of memory that has the faster memory access time is available to perform the operation to resolve the unknown object.

5. The method of claim 1, wherein the processor, the first memory device, and the second memory device are resident on a mobile computing device, and wherein the method further comprises:
determining that the unknown object presents an impending danger to a user of the mobile computing device; and
updating route information associated with the mobile computing device to route the user of the mobile computing device away from the unknown object.

6. The method of claim 1, wherein the processor, the first memory device, and the second memory device are resident on a mobile computing device, and wherein the method further comprises:
determining that the unknown object cannot be resolved within the threshold period of time corresponding to a user of the mobile computing device coming into contact with the unknown object; and
updating route information associated with the mobile computing device to route the user of the mobile computing device away from the unknown object.

7. The method of claim 1, further comprising:
determining that the processor is receiving network coverage from a first base station;
determining that the processor has moved to a different geographical location and is receiving network coverage from a second base station; and
performing the operation to reallocate computing resources between the first memory device and the second memory device in response to determining that the processor is receiving network coverage from the second base station.

8. The method of claim 1, further comprising generating vibrational patterns corresponding to navigation in the presence of the unknown object or voice-assisted navigation updates corresponding to navigation in the presence of the unknown object, or both.

9. An apparatus, comprising:
a first memory device comprising a first type of media;
a second memory device comprising a second type of media; and
a processor coupled to the first memory device and the second memory device, wherein the processor is to:
determine that an image captured by an imaging device coupled to the processor contains an unknown object;
determine, based at least in part on a determined confidence level associated with the image, that the unknown object is not resolvable within a threshold period of time;
perform an operation to reallocate computing resources between the first memory device and the second memory device in response to determining that the unknown object is not resolvable within the threshold period of time;
write at least a portion of data associated with the unknown object to the reallocated computing resources of the first memory device or the second memory device, or both; and
perform, using the reallocated computing resources, an operation involving the data corresponding to the unknown object to resolve the unknown object.

10. The apparatus of claim 9, wherein the processor is to determine, based at least in part on an object recognition model executed by the processor, that the unknown object is not resolvable within the threshold period of time.

11. The apparatus of claim 9, wherein the first type of media and the second type of media each comprise sets of memory cells that exhibit different storage characteristics.

12. The apparatus of claim 9, wherein:
the first memory device or the second memory device is a non-persistent memory device, and
the other of the first memory device or the second memory device is a persistent memory device.

13. The apparatus of claim 9, wherein:
the first memory device or the second memory device is a NAND flash memory device that comprises a set of single level memory cells (SLCs) and a set of multi-level memory cells (MLCs), and
the processor is to write the data corresponding to the unknown object to the set of SLC memory cells as part of the operation to resolve the unknown object.

14. The apparatus of claim 9, wherein the processor, the first memory device, and the second memory device are resident on a mobile computing device, and wherein the processor is to:
determine that the mobile computing device has experienced a handoff from a first base station to a second base station; and
perform the operation to reallocate computing resources between the first memory device and the second memory device responsive to the determination that the mobile computing device has experienced the handoff.

15. The apparatus of claim 9, wherein the processor, the first memory device, and the second memory device are resident on a mobile computing device, and wherein the processor is to:
determine that the unknown object presents an impending danger to a user of the mobile computing device or determine that the unknown object cannot be resolved within a threshold period of time corresponding to the user coming into contact with the unknown object, or both; and
update route information associated with the mobile computing device to route the user of the mobile computing device away from the unknown object.

16. The apparatus of claim 9, wherein the processor is to execute instructions corresponding to one or more machine learning operations as part of performance of the operation involving the data corresponding to the unknown object to resolve the unknown object.

17. A system, comprising:
a mobile computing device coupled to an imaging device and comprising a processor, a first memory device, a second memory device, and a third memory device; and
the imaging device resident on the mobile computing device and couple to the processor, wherein the processor is to:
receive an image captured by the imaging device coupled to the processor that contains greater than a threshold quantity of unidentifiable pixels;
classify the captured image as an image that contains an unknown object based on the image containing greater than the threshold quantity of unidentifiable pixels;
determine that at least a portion of the of unidentifiable pixels are not resolvable within a first threshold period of time, based at least in part, on an object recognition model executed by the processor or a determined confidence level associated with the captured image, or both;
determine that the unknown object presents an impending danger to a user of the mobile computing device;
reallocate computing resources amongst the first memory device, the second memory device, or the third memory device, or any combination thereof in response to the determination that at least the portion of the unidentifiable pixels are not resolvable within the first threshold period of time or the determination that the unknown object presents the impending danger to the user of the mobile computing device, or both;
perform, using the reallocated computing resources, an operation involving at least the portion of the unidentifiable pixels corresponding to the unknown object to resolve the unknown object; and
determine, within a second threshold period of time, whether the operation to resolve the unknown object is successful.

18. The system of claim 17, wherein the processor is to notify the user of the mobile computing device that the unknown object is resolved in response to a determination that the operation to resolve the unknown object is successful within the second threshold period of time.

19. The system of claim 17, wherein the processor is to update route information associated with the mobile computing device to route the user of the mobile computing device away from the unknown object in response to a determination that the operation to resolve the unknown object is unsuccessful within the second threshold period of time.

20. The system of claim 17, wherein:
at least one of the first memory device, the second memory device, or the third memory device comprises a flash memory device,
at least one of the first memory device, the second memory device, or the third memory device comprises a dynamic random-access memory device, and
at least one of the first memory device, the second memory device, or the third memory device comprises a resistance variable memory device.

21. The system of claim 17, wherein the processor is to:
determine that the first memory device or the second memory device or the third memory device exhibits a higher bandwidth than another of the first memory device or the second memory device or the third memory device; and
perform the reallocation of the computing resources amongst the first memory device, the second memory device, or the third memory device, or any combination thereof, such that:
greater than a first threshold amount of memory that exhibits the higher bandwidth is available to perform the operation to resolve the unknown object, or
greater than a second threshold amount of memory that exhibits a faster memory access time is available to perform the operation to resolve the unknown object; and
perform, using the reallocated computing resources, the operation involving the unidentifiable pixels corresponding to the unknown object to resolve the unknown object using the first memory device, the second memory device, or the third memory device, or any combination thereof, that exhibits the higher bandwidth to perform the operation to resolve the unknown object, or the faster memory access time to perform the operation to resolve the unknown object, or both.

22. The system of claim 17, wherein the processor is to:
determine that the mobile computing device has experienced a handoff from a first base station to a second base station; and
perform the operation to reallocate computing resources between the first memory device and the second memory device responsive to the determination that the mobile computing device has experienced the handoff.

23. The system of claim 17, wherein the processor is to generate vibrational patterns corresponding to navigation in the presence of the unknown object or voice-assisted navigation updates corresponding to navigation in the presence of the unknown object, or both.

24. The system of claim 17, wherein the processor is to perform the operation involving the unidentifiable pixels corresponding to the unknown object to resolve the unknown object as part of execution of instructions to assist a visually impaired user of the mobile computing device.

* * * * *